United States Patent [19]

Muller

[11] Patent Number: 5,111,345
[45] Date of Patent: May 5, 1992

[54] DISK MEMORY DEVICE

[75] Inventor: Ronald M. Muller, Upper Marlboro, Md.

[73] Assignee: The United States of America as represented by the Administrator, National Aeronautics & Space Administration, Washington, D.C.

[21] Appl. No.: 357,928

[22] Filed: May 26, 1989

[51] Int. Cl.$^5$ .................. G11B 5/09; G11B 17/22; G11B 3/74

[52] U.S. Cl. ..................... 360/48; 369/32; 369/95; 360/98.01

[58] Field of Search ............ 360/48, 49, 78.04, 98.01, 360/98.02, 73.03, 77.02, 47; 369/30, 32, 34, 95, 111

[56] References Cited

U.S. PATENT DOCUMENTS 4,516,177  5/1985  Moon et al. ............... 360/77
4,714,967 12/1987  Bizjak ....................... 360/48
4,873,679 10/1989  Murai et al. .............. 360/48

OTHER PUBLICATIONS

McLaughlin, "Disc File Memories", Instruments and Control Systems, vol. 34, Nov./61, pp. 2063-2068.

Primary Examiner—Aristotelis Psitos
Assistant Examiner—Won Tae C. Kim
Attorney, Agent, or Firm—R. Dennis Marchant; John R. Manning; Paul S. Clohan

[57] ABSTRACT

A disk memory device is provided that will maximize the storage capacity of a memory disk while at the same time maximize the record and playback data rate. Two recording disks are mounted upon a common shaft that is rotated at a fixed speed. Each disk has a recording area including a surface upon which data can be recorded/read in the form of tracks arranged either in concentric tracks or in a spiral. The recording area surfaces are divided into multiple concentric track groups. Two read/write heads and two head positioning servos (including electronic controls) are mounted such that each disk recording surface can be read out or written by the read/write heads. Each track of the multiple track groups of the first disk are given designated numbers beginning with the outer track of the outermost or edge track group and continuing in higher consecutive numbers until the inner track of the innermost track group is designated. However, each track of the multiple track groups of the second disk are given designated numbers in the exact reverse order of the first disk, such that the combined length of a track from the first disk, when added to the length of the same numbered track of the second disk is a constant, generating a constant data rate for the disk memory device.

6 Claims, 3 Drawing Sheets

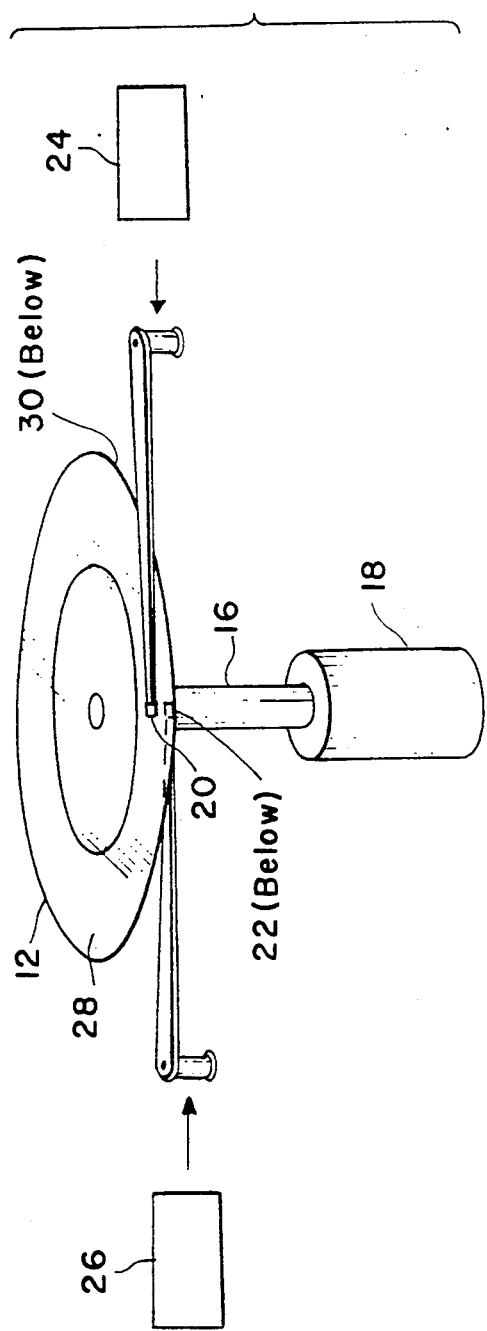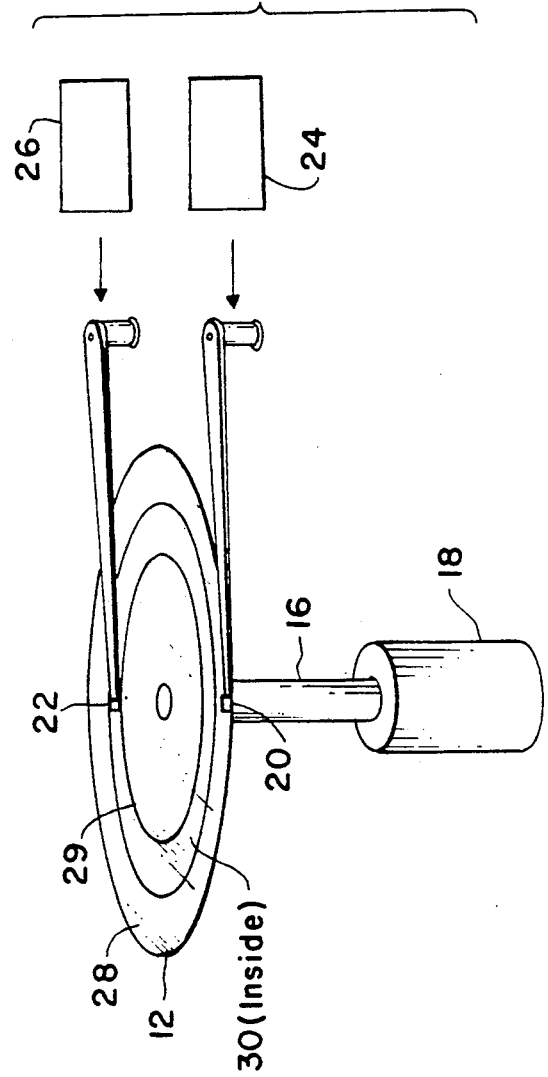

DISK MEMORY DEVICE

ORIGIN OF THE INVENTION

The invention described herein was made by an employee of the United States Government and may be manufactured and used by or for the Government for governmental purposes without the payment of any royalties thereon or therefor.

TECHNICAL FIELD

The invention relates in general to both magnetic and optical recording and more particularly to apparatus/techniques for maximizing the storage capacity of computer memory disks. More specifically, the present invention maximizes the capacity of a memory disk while at the same time maximizing the record and playback data rate.

BACKGROUND ART

Present disk memory devices use magnetic or optical methods to write (or read) digital data onto a magnetic or optical disk. For either data recording method, the present art allocates the memory surface of the disk in two basic ways. One way is to write (or read) the data onto a single, narrow spiral track that runs from the edge of the disk towards the center of the disk. An example of this is the Compact Disk. Another technique allocates the surface into many, narrow concentric tracks. This is the usual approach to a computer disk memory. For this present invention description, the many concentric data tracks will be assumed, but there is an equivalent implementation of the invention for the single spiral data track allocation method.

For all disks, the innermost track is always somewhat shorter than the outermost or edge track. For present art, the outer-track to inner-track length is typically 2:1. If the bit packing density along the track were constant, the edge track would be able to store twice the data that can be stored on the innermost track of the disk. Unfortunately, present art either wastes this storage capacity or, if this capacity is used, constrains the data rate and/or data access time. Three examples of the present art are discussed below.

Many present art disk memory devices use a fixed data rate and a fixed disk rotational speed. An example of this type of device is the disk memories used in computers. The number of bits per track on the disk is then fixed at whatever can be stored along the shortest, innermost track and the maximum data rate is set by the time it takes the disk to make one revolution. For a 2:1 outertrack to inner-track ratio, this present art does not utilize 25% of the available storage area.

Another present art disk memory device uses the full capacity of the disk but varies the disk rotational speed depending on which part of the disk is being used at the time. In this case, the maximum data rate is set by the maximum rotational speed and the number of bits on the last track. This fully uses the memory area and, with a sacrifice in data rate, allows going to larger outertrack to inner-track length ratios. For instance, a 3:1 ratio gives an 18.5% increase in data capacity for the disk but with a data rate reduction of 33.3%. This art is adequate for certain applications such as when the data are played sequentially from one end to the other, for example, such as in a video recording disk. However, this technique is not practical as a computer storage device. Computer applications require random accessing one track or another and the time for the disk to achieve the correct speed when jumping among the various data tracks would be unacceptably long.

A third possibility for implementing a disk memory device with the present art would be to use a constant rotational rate and allow the data rate to vary depending on which track was being used For a 3:1 ratio of track lengths, a track at the disk's edge would produce a data rate three times higher than the innermost track would produce. This would maximize the number of bits that could be stored on the disk, but the variable data rate would not be acceptable for most user of the memory.

STATEMENT OF THE INVENTION

Accordingly, it is an object of the invention to provide a disk memory device that will maximize the storage capacity of the memory disk while at the same time maximize the record and playback data rate.

It is yet another object of the invention to improve the performance of any computer that includes disk memory devices that utilize either magnetic and optical methods.

It is still another object of the invention to provide a disk memory device that operates at a constant rotational speed and also provides for a high and constant data rate.

These and other objects are accomplished in a disk memory device wherein, in its simplest form, has a disk with two recording area surfaces upon which data can be recorded/read in the form of tracks or in a spiral wherein the recording area surfaces are divided into multiple concentric track groups. The disk is rotated at a constant speed and two read write/heads, one for each disk surface, read data from or write data onto the disk surfaces. The recording areas for the disk surfaces are uniquely designed so that the device maximizes the memory capacity of the disk while at the same time the device maximizes the system record and playback data rate.

In the preferred embodiment of this invention, two recording disks are mounted upon a common shaft that is rotated at a fixed speed by an electric motor. Each disk has a recording area including a surface upon which data can be recorded/read in the form of tracks arranged either in concentric tracks or in a spiral and wherein the recording area surfaces are divided into multiple concentric track groups. Two read/write heads and two head positioning servos (including electronic controls) are mounted such that each disk recording surface can be read out (or written) by the read/write heads. Each track of the multiple track groups of the first disk ar given designated numbers beginning with the outer track of the outermost or edge track group and continuing in higher consecutive numbers until the inner track of the innermost track group is designated. However, each track of the multiple track groups of the second disk are given designated numbers in the exact reverse order of the first disk, such that the combined length of a track from the first disk, when added to the length of the same numbered track of the second disk is a constant, thereby generating a constant data rate for the disk memory device.

BRIEF DESCRIPTION OF THE DRAWINGS

In the drawings like parts are designated by the same references.

FIG. 4 shows an alternate embodiment of the disk memory device in which a single disk with two sides is utilized for the disk memory device rather than using two separate disks.

FIG. 5 shows an embodiment in which a single disk is utilized with two read/write heads operating on two recording surfaces located on the top side of the disk.

DETAILED DESCRIPTION OF THE INVENTION

Figure 1:
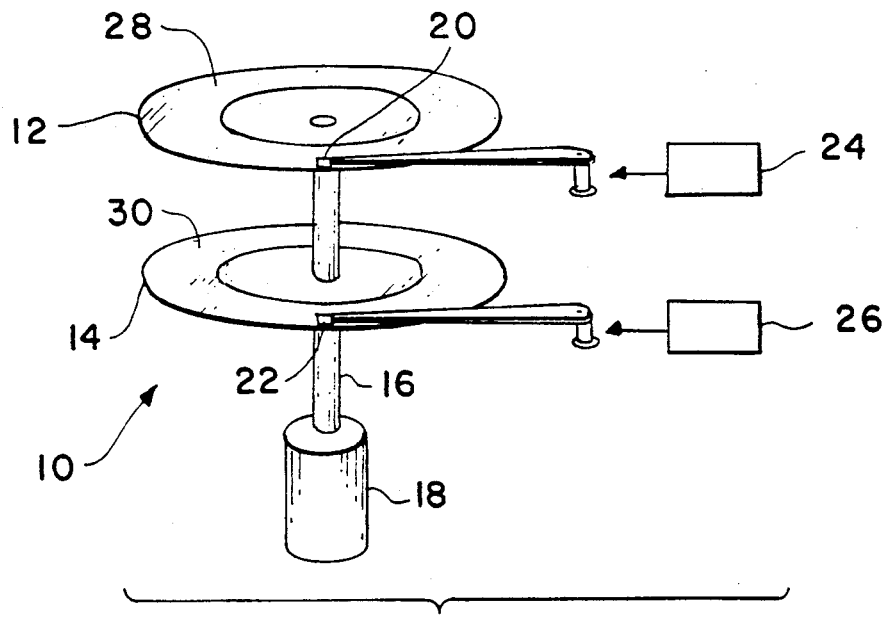
FIG. 1 is a perspective view of one embodiment of the disk memory device.

The preferred disk memory device 10 is shown generally in FIG. 1 wherein two recording disks 12 and 14 are mounted upon a common shaft 16. The shaft 16 is rotated at a fixed speed by a motor 18 which is preferably an AC synchronous motor for this embodiment; however, it could be another type of motor such as a servo-controlled DC motor with a tachometer to control precise speed settings. Two read/write heads 20 and 22 and two head positioning servos 24 and 26 are mounted such that each disk recording surface 28 and 30 can be read out (or written) by the heads 20 and 22.

Figures 2A, 2B:
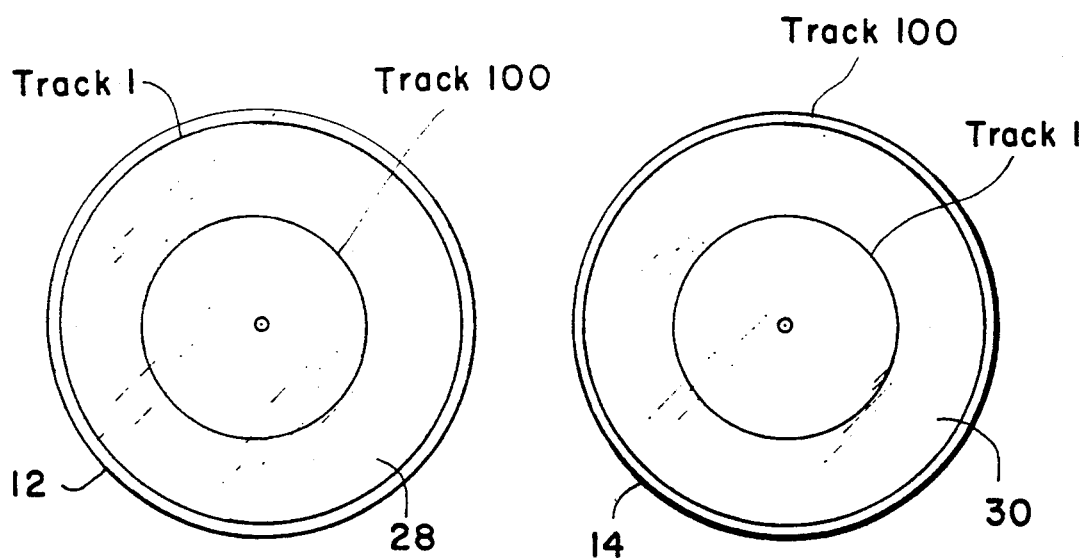
FIGS. 2a and 2b are a view of the two disks shown in FIG. 1 that illustrates the track layout for each disk.

FIGS. 2a and 2b show the track layout on surfaces 28 and 30 for the two disks 12 and 14 in which each disk surface is divided into 100 tracks. Recording surface 28 is numbered such that the edge track is Track No. 1 and the innermost track is Track No. 100, whereas, recording surface 30 is numbered such that the edge track is Track No. 100 and the innermost track is Track No. 1. In all cases, the combined length of a track from one disk plus the length of the same numbered track on the other disk is a constant. This means that if the two heads 20 and 22 are commanded to write (or read) a given track, their combined capacity will be a constant number of bits. Also if the disk is rotated at a constant rate, the data rate would be constant and equal to the combined data rate of the outermost track plus the data rate of the innermost track. For a 3:1 track length ratio, if the inner track's rate was 1 megabyte per second (mbps.) then the outer track's data rate would be 3 mbps. for a combined data rate of 4 mbps. Each of the 100 possible combined tracks would also have a data rate of 4 mbps.

In actual practice, it may be impractical to exactly match the optimum data rate for each track because that would require a different data rate for each of the many tracks on a disk. In the example of 100 tracks on each surface of each disk, 100 different data rates would be required. Fortunately, the ideal can be approximated by grouping tracks and using the same data rate for any track within the group. This is tabulated in Table 1 where the 100 tracks are arranged into ten, ten-track groups. Tracks 1 through 10 would be grouped, as would be 11 through 20 and so forth. The maximum number of bits per track within any group will be set by the shortest (innermost) track within that group. For the example above where the ideal combined data rate was 4 mbps., this grouping results in a maximum data rate of 3.8 mbps. or 95% of the ideal. The utilization of the recording surface will drop to 95.5% of the ideal utilization.

TABLE 1

| Track Number | Head 20 Data Rate (mbps) | Head 22 Data Rate (mbps) | Combined Data Rate |
|---|---|---|---|
| 1 thru 10 | 2.8 | 1.0 | 3.8 |
| 11 thru 20 | 2.6 | 1.2 | 3.8 |
| 21 thru 30 | 2.4 | 1.4 | 3.8 |
| 31 thru 40 | 2.2 | 1.6 | 3.8 |
| 41 thru 50 | 2.0 | 1.8 | 3.8 |
| 51 thru 60 | 1.8 | 2.0 | 3.8 |
| 61 thru 70 | 1.6 | 2.2 | 3.8 |
| 71 thru 80 | 1.4 | 2.4 | 3.8 |
| 81 thru 90 | 1.2 | 2.6 | 3.8 |
| 91 thru 100 | 1.0 | 2.8 | 3.8 |

Figure 3:
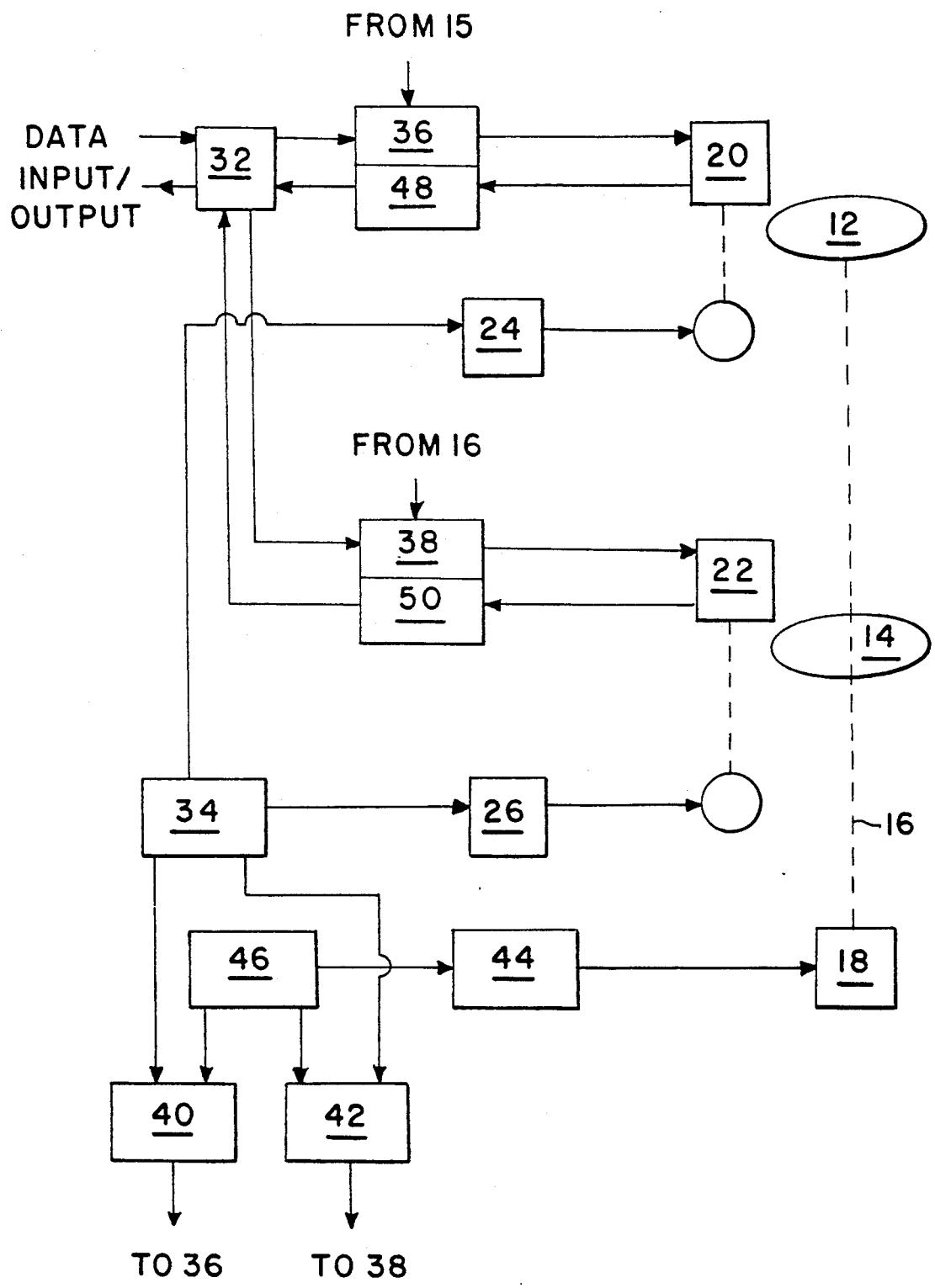
FIG. 3 is a block diagram showing the typical electronics required to operate the disk memory device.

FIG. 3 is a block diagram of the typical electronics needed to operate the disk memory device. To record data, a data buffer 32 temporarily stores the data to be recorded while the track control electronics 34 commands the two head positioning servos 24 and 26 to position the heads 20 and 22 over the appropriate tracks. Once the heads are in place over the track and the proper location along the track is found, the data are taken from the buffer 32 and recorded through the record electronics 36 and 38 at the rates shown in Table 1 for that track. For this example, the write cycle repeats in multiples of 19 bits. Thus, when writing data to Track 1, head 20 would write 14 bits in the time it takes head 22 to write 5 bits. Similarly, when writing to Track 33, head 20 would write 11 bits in the same time it takes head 22 to write 8 bits. In practice, the data are taken from the buffer 32 in blocks of many bits and recorded by one head or the other as a block. Before recording, these blocks are given additional bits for the purpose of identification, error correction and synchronization to the extent required by the playback process. Since a block contains a fixed number of bits, the write cycle will also repeat in multiples of 19 blocks. That is, when writing to Track 1, head 20 would write 14 blocks in the time it takes head 22 to write 5 blocks.

If the disk is manufactured with a timing track for each group of tracks, a reading head reads this track to keep the data on the other tracks in the group in synchronism with the disk's rotational rate. If the disk is not manufactured with a timing track for each group of tracks, a method is required to insure that the proper number of bits are recorded per turn of the disk. This is accomplished by two programmable frequency synthesizers 40 and 42 and a frequency divider 44 output. For any given track, the two programmable outputs produce the bit rates indicated in Table 1 for that track. The fixed frequency divider 44 drives the AC synchronous motor 18 that rotates the disks. All three outputs are derived from the master oscillator 46. This insures that the data on any track will be appropriately recorded.

To play data back, the heads 20 and 22 are positioned as in the write mode and each head reads its data track. This signal is processed by the read circuitry 48 and 50. Either the built-in timing track or the programmable frequency sources 40 and 42 may be used to help recover the data from each head and minimize reading errors. The data blocks from each head are then placed onto the buffer memory 32 and read out in such a way that the original bit configuration is reproduced. This is achieved by using the identification and synchronization words. If required by the application, error correction may also be performed on the block of data before it is sent out of the buffer 32. These techniques are well known to practitioners of the disk recording art.

While FIG. 1 shows the preferred embodiment of two single-sided disks mounted onto a shaft, alternate embodiments are possible. Two such alternatives are shown in FIGS. 4 and 5. FIG. 4 shows a single disk 12 with two sides having surfaces 28 (top surface) and 30 (bottom surface), and having read/write heads 20 and 22, respectively, for each surface. FIG. 5 shows a single disk 12 with two read/write heads 20 and 22 operating on the top side of disk 12, with head 20 operating on outside surface 28 of disk 12 and head 22 operating on inside surface 30 of disk 12. In FIG. 5, however, only one-half as many recording tracks would be available for this embodiment because the read/write heads 20 and 22 would be restrained at center border 29 for surfaces 28 and 30 of disk 12. For example, if the track numbers shown in Table 1 were utilized, only track numbers 1 through 50 would be utilized for both read/write heads 20 and 22. Either of the configurations would be the preferred configuration if the disk were to be recorded on one machine, removed from that machine and then played back on another machine. Other embodiments might include multiple disk configurations of FIGS. 1, 4 or 5. These configurations would be used to achieve greater storage capacity and/or higher data rates.

By providing the disk memory device as is disclosed herein, utilizing the uniquely designed disk memory storage surfaces, it is now possible to maximize the storage capacity of a memory disk while at the same time maximize the record and playback data rate of the disk system.

While the disk memory device of the present invention has been described in considerable detail, it is understood that various changes and modifications may occur to persons of ordinary skill in the art without departing from the spirit and scope of the invention as defined in the appended claims.

What is claimed is:

1. A disk memory device for recording and/or reading data comprising:
    a first recording surface on at least one disk and a second recording surface on said at least one disk or a different disk, said first and second recording surfaces each divided into a number of multiple concentric track groups such that the outermost track of said first recording surface is track 1 and continuing in higher consecutive numbers until the innermost track of said first recording surface is track n while the innermost track of said second recording surface is track 1 and continuing in higher consecutive numbers until the outermost track of said second recording surface is track n such that the combined length of a track from said first recording surface plus the length of the same numbered track on said second recording surface is constant;
    means for driving said at least one disk;
    means for recording and reproducing said data on said first and second recording surfaces including a first read/write head for reading/writing data on said first recording surface, and a second read/write head for reading/writing data on said second recording surface, said first and second read/write heads reading/writing at the same time such that the combined capacity of said first and second read/write heads is a constant number of bits; and
    means for reading the data recorded on said first and second recording surfaces.

2. The apparatus as recited in claim 1 wherein said means for driving said at least one disk includes a shaft upon which said at least one disk is mounted and rotated at a constant speed.

3. The apparatus as recited in claim 2 wherein said means for driving said at least one disk includes an AC synchronous electric motor.

4. The device as recited in claim 2 wherein said means for recording and reproducing said data further comprises:
    positioning servo means for positioning said first and second read/write heads;
    means for controlling said positioning servo means; and
    data buffer means connected to said read/write heads for temporarily storing said data to be recorded.

5. The device as recited in claim 2 wherein said first and second recording surfaces are on opposite sides of said at least one disk.

6. The device as recited in claim 2 wherein said first and second recording surfaces are on the same side of said at least one disk.

* * * * *